(12) United States Patent
Vaisanen

(10) Patent No.: US 7,080,706 B2
(45) Date of Patent: Jul. 25, 2006

(54) ADJUSTABLE SNOWMOBILE FOOTHOLDS

(75) Inventor: Esa Vaisanen, Rovaniemi (FI)

(73) Assignee: BRP Finland Oy, Rovaniemi (FI)

( * ) Notice: Subject to any disclaimer, the term of this patent is extended or adjusted under 35 U.S.C. 154(b) by 147 days.

(21) Appl. No.: 10/915,473

(22) Filed: Aug. 11, 2004

(65) Prior Publication Data

US 2005/0034909 A1 Feb. 17, 2005

Related U.S. Application Data

(60) Provisional application No. 60/493,802, filed on Aug. 11, 2003.

(51) Int. Cl.
*G05G 1/18* (2006.01)
(52) U.S. Cl. ......................... 180/190; 74/564
(58) Field of Classification Search ................ 180/190, 180/9, 9.1, 9.21, 233, 219, 220; 280/291; 74/564 X, 560
See application file for complete search history.

(56) References Cited

U.S. PATENT DOCUMENTS

| | | | | |
|---|---|---|---|---|
| 2,567,529 | A | * | 9/1951 | Schetzer ...................... 74/564 |
| 4,506,754 | A | * | 3/1985 | Hirano et al. ............... 180/219 |
| 2003/0127265 | A1* | | 7/2003 | Watson et al. .............. 180/190 |
| 2003/0201128 | A1* | | 10/2003 | Girouard et al. ............ 180/190 |
| 2004/0104062 | A1* | | 6/2004 | Bedard et al. .............. 180/190 |

OTHER PUBLICATIONS

Ski-Doo Parts Catalog, MX Z, 2003, p. D8 (Part No. 484 400 355).

* cited by examiner

*Primary Examiner*—Tony Winner
(74) *Attorney, Agent, or Firm*—Osler, Hoskin & Harcourt LLP

(57) ABSTRACT

A foothold assembly for a snowmobile having a tunnel and footrests extending from either side of the tunnel for receiving feet of a driver thereon. The foothold assembly comprises a foothold member adapted for receiving a foot of the driver therein. The foothold member is longitudinally displaceable relative to the footrests and is removably fastenable in place thereon.

20 Claims, 4 Drawing Sheets

ADJUSTABLE SNOWMOBILE FOOTHOLDS

This application claims the benefit of priority to U.S. Provisional Application 60/493,802 filed on Aug. 11, 2003, the contents of which are incorporated herein by reference.

TECHNICAL FIELD

The present invention relates generally to footholds of a snowmobile, and relates more particularly to snowmobile footholds which are adjustable such that various riding positions are permitted.

BACKGROUND OF THE INVENTION

Snowmobiles are typically constructed such that, when the driver is seated, his or her feet are flat on footrests integrally formed with the tunnel on either side of the vehicle. Particularly, the tunnel generally comprises a flat horizontal top portion which supports the seat, vertical sides downwardly extending from the top portion, and running board-type footrests horizontally extending from the bottom of the vertical sides. Typically, the footrests have crimped holes which are formed such that upward projections provide improved traction for the boot of the driver. The horizontal outer edges of the footrests are usually rolled over to form an edge lip, which removes sharp edges, provides some additional rigidity to the sheet metal footrests, and helps provide some traction to reduce the possibility of the driver's foot laterally slipping off the footrest.

Many snowmobiles further include footholds, which provide a vertical support above the foot of the driver. Such footholds are used to help the driver keep both feet securely planted on the horizontal footrests, which becomes particularly necessary for relatively active riding over rough terrain or at high speeds. Vertical foothold supports located above the foot permit the driver to lean out to one side of the snowmobile and remain secured to the vehicle, by using the foothold on the opposite side to hold him or herself to the snowmobile.

Until recently, most snowmobiles have shared a very similar driving position, namely a body position wherein the feet are in front of the knees and the knees above the hips. Such a driving position is very comfortable, and can be likened, in terms of body position, to sitting on a sofa. However, this riding position is not a very active position, and consequently whenever the driver needs to raise himself from the seat, he must use his arms to pull himself up with the handlebars. Further, with the feet so far forward it can be very awkward to stay in a standing position, as the handlebars are close to the driver's thighs and thus tend to force the driver rearward. Accordingly, when the driver needs to stand on most conventional snowmobiles, he must pull himself forward using his arms, and in order to remain standing, must bring his feet backward on the footrests such that his thighs do not interfere with the handlebars.

A snowmobile now exists for which the driver is seated in a more active position, having the feet normally positioned on the footrests behind the knees and the knees located below the hips. This arrangement positions the driver in an active riding stance at all times, allowing his legs to be used for impact absorption. Such a driving position allows the driver to easily stand when necessary. However, this more active riding position is considered by some drivers to be less comfortable for long rides or when a less aggressive riding style is required due to smoother terrain.

Therefore, it is desirable for a driver to be able to position his feet in different locations along the footrest of the snowmobile, depending on the particular riding style required. However, footholds currently employed remain in a fixed position, and therefore the driver is not able to displace his feet on the footrests while maintaining optimal control of the vehicle.

While it is known to provide snowmobile footholds with a vertical height adjustment to accommodate for different boot sizes, horizontal adjustments of the position of the footholds is not possible. However, as the preferred location of ones feet on the horizontal footrests may differ depending on factors such as riding style, height of the driver and terrain, there exists a need for a more versatile snowmobile foothold which accommodate various driver foot positions.

SUMMARY OF THE INVENTION

It is an object of the present invention to provide an improved foothold for a snowmobile which is adjustable such that different riding positions are permitted.

It is another object of the present invention to provide a snowmobile having footholds which are both horizontally and vertically adjustable.

Therefore, in accordance with the present invention, there is provided a foothold assembly for a snowmobile having a tunnel and footrests extending from either side of the tunnel for receiving feet of a driver thereon, the foothold assembly comprising: a foothold member adapted for receiving a foot of the driver therein; and the foothold member being longitudinally displaceable relative to the footrests and removably fastenable in place thereon.

There is also provided, in accordance with the present invention, a snowmobile comprising: a chassis including a tunnel; an engine disposed on the chassis at a forward end thereof and a seat disposed on the tunnel behind the engine, the tunnel having footrests outwardly extending from either side thereof for receiving feet of a driver; two skis linked to the chassis by a front suspension system; a steering device disposed on the chassis forward of the seat and being operatively connected to the skis for steering the snowmobile; a drive track disposed below the tunnel and being operatively connected to the engine for propulsion of the snowmobile; a foothold member for retaining a foot of the driver in contact with the snowmobile; and the foothold member being longitudinally displaceable relative to the footrests and removably fastenable in place thereon.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1:
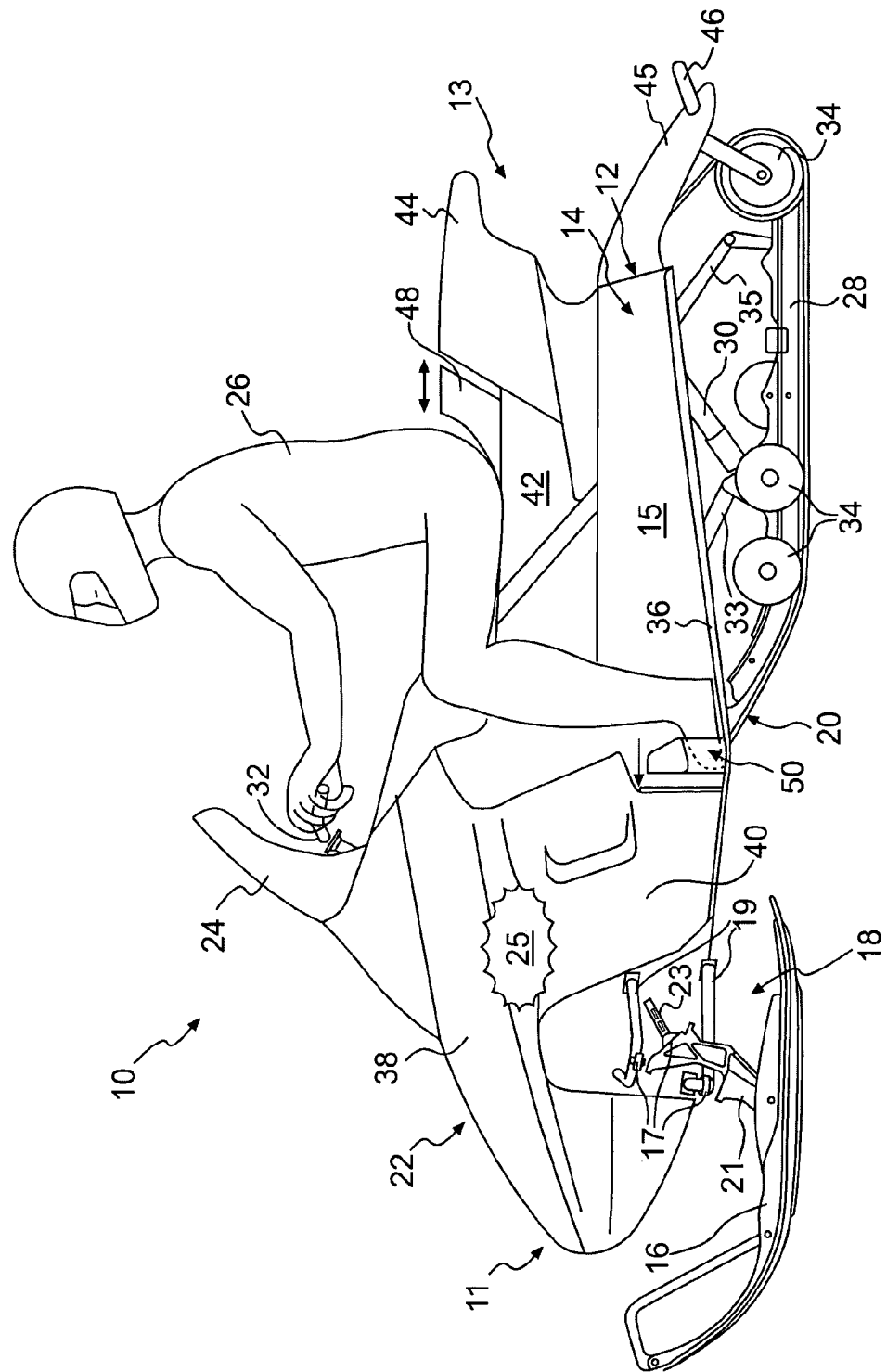
FIG. 1 is a side elevation view of a snowmobile having footholds in accordance with the present invention and showing a user in a normal riding position.

FIG. 1 shows a snowmobile 10 having a forward end 11 and a rearward end 13, defined consistently with a travel direction of the vehicle. The snowmobile 10 includes a chassis 12 which normally includes a rear tunnel portion 14, a front engine cradle portion (not shown), and a front suspension assembly portion (not shown). While hidden behind the fairings 22 in FIG. 1, an engine 25, which provides motive force for the vehicle, is supported by the engine cradle portion of the chassis 12. In addition, two front skis 16 are attached to the forward end of the chassis 12 through a front suspension system 18. The front suspension system 18 generally comprises a double A-arm type suspension, having two A-arms 19 on either side of the vehicle, which link a ski leg 21 with the chassis 12. The ski legs 21 are attached to the skis 16 at a lower end and to the upper and lower A-arms 19 at an upper end thereof. The ski leg 21 preferably includes three ball joints 17 at the attachment points with the upper and lower A-arms 19 and with the steering rod 23. The steering rod 23 rotates the ski leg 21 about an axis defined by the ball joints 17, between the ski leg 21 and the A-arms 19, to rotate the skis 16. The steering rods 23 are linked to a steering device 32, such as a handlebar, which is positioned forward of a driver for providing directional control of the snowmobile 10. Thus, by turning the steering device 32, the ski legs 21 are pivoted, thereby turning the skis 16 to steer the vehicle in a desired direction.

At the front of the chassis 12, the snowmobile 10 comprises an external shell including fairings 22 that enclose the engine 25 to protect it, and which can be decorated to render the snowmobile 10 more aesthetically pleasing. Typically, the fairings 22 comprise a hood 38 and one or more side panels 40. In the particular snowmobile 10 depicted, the side panels 40 open away from the snowmobile along a vertical axis, independently from the hood 38, which pivots forward about a horizontally extending axis. A windshield 24, which may be connected either to the fairings 22 near the forward end 11 of the snowmobile 10 or directly to the handlebars 32, acts as a wind deflector to lessen the force of the air on the driver 26 when the snowmobile is moving.

A drive track 20 is disposed under tunnel 14 of the chassis 12 and is operatively connected to the engine 25 for propulsion of the snowmobile 10. A rear suspension system 27 comprises two parallel slide rails 28, which generally position and guide the endless drive track 20 and which have idler wheels 34 engaged thereto. The rear suspension system 27 further includes at least one shock absorber 30, and comprises forward and rear suspension arms 33 and 35 which attach the slide rails 28 to the chassis 12.

A seat 42 is provided at the rearward end 13 of snowmobile 10 behind the engine 25. A rear portion 44 of the seat 42 may include a storage compartment or can be used to provide a passenger seat. Additionally, a rear grab handle/bumper 46 extends from a rear fairing 45.

The tunnel 14 comprises a flat horizontal top portion which supports the seat 42, and vertical sides 15 which downwardly extend to the running board-type footrests 36. The footrests 36 horizontally extend from the bottom of the vertical sides 15 on either side of the vehicle. The footrests 36 are provided with crimped holes 39 which are pushed upward forming upward projections which provide improved traction for the boot of the driver on the footrests 36. The horizontal outer edges of the footrests 36 are rolled over to form an edge lip 37 which provides rigidity to the sheet metal footrests 36 and which provide some further amount of anti-slip protection. The rolled edge lips 37 can be covered with a separate anti-slip material to further improve traction.

Figure 3:
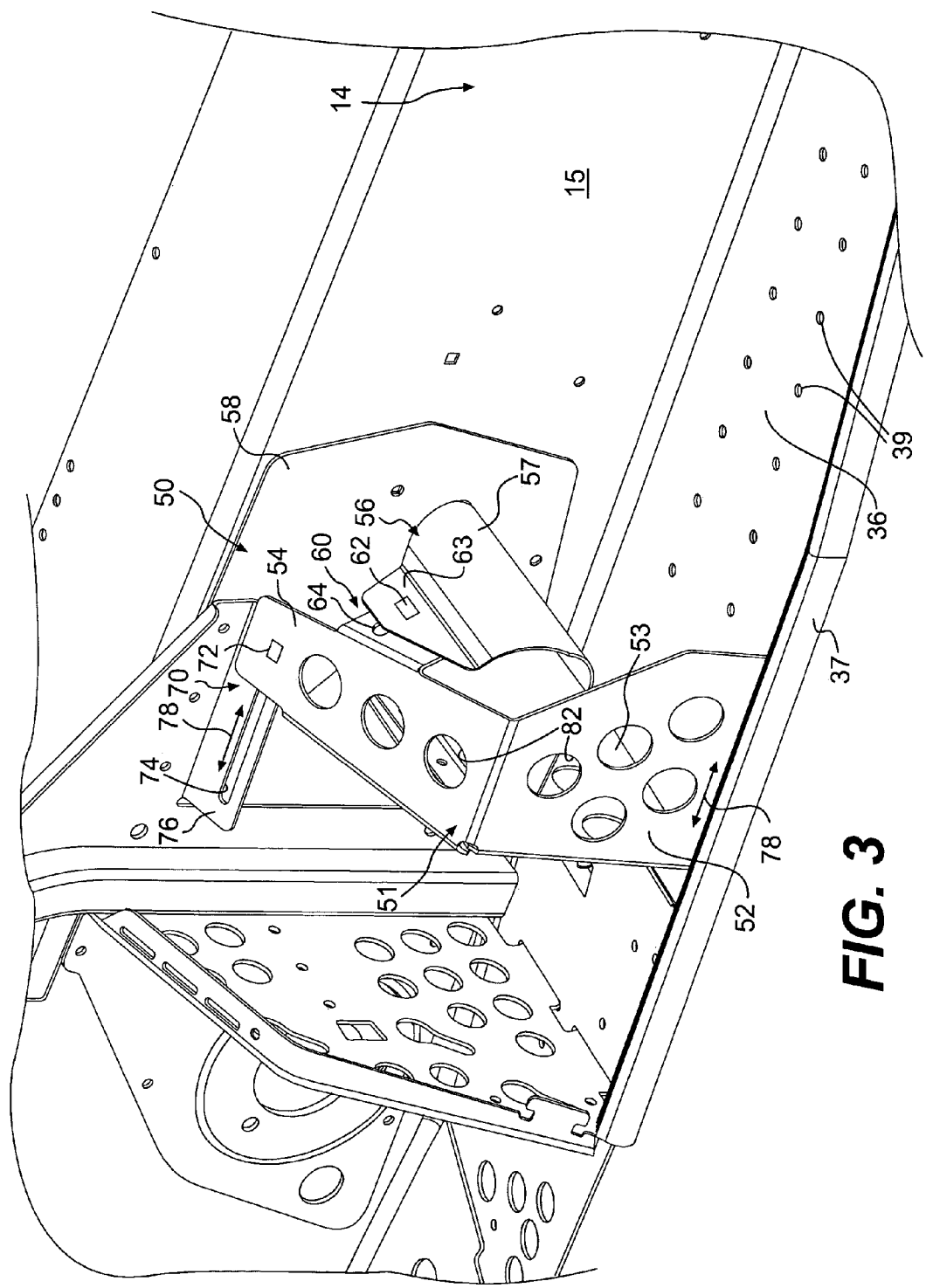
FIG. 3 is an enlarged perspective view of the footholds in accordance with the present invention.
Figure 4:
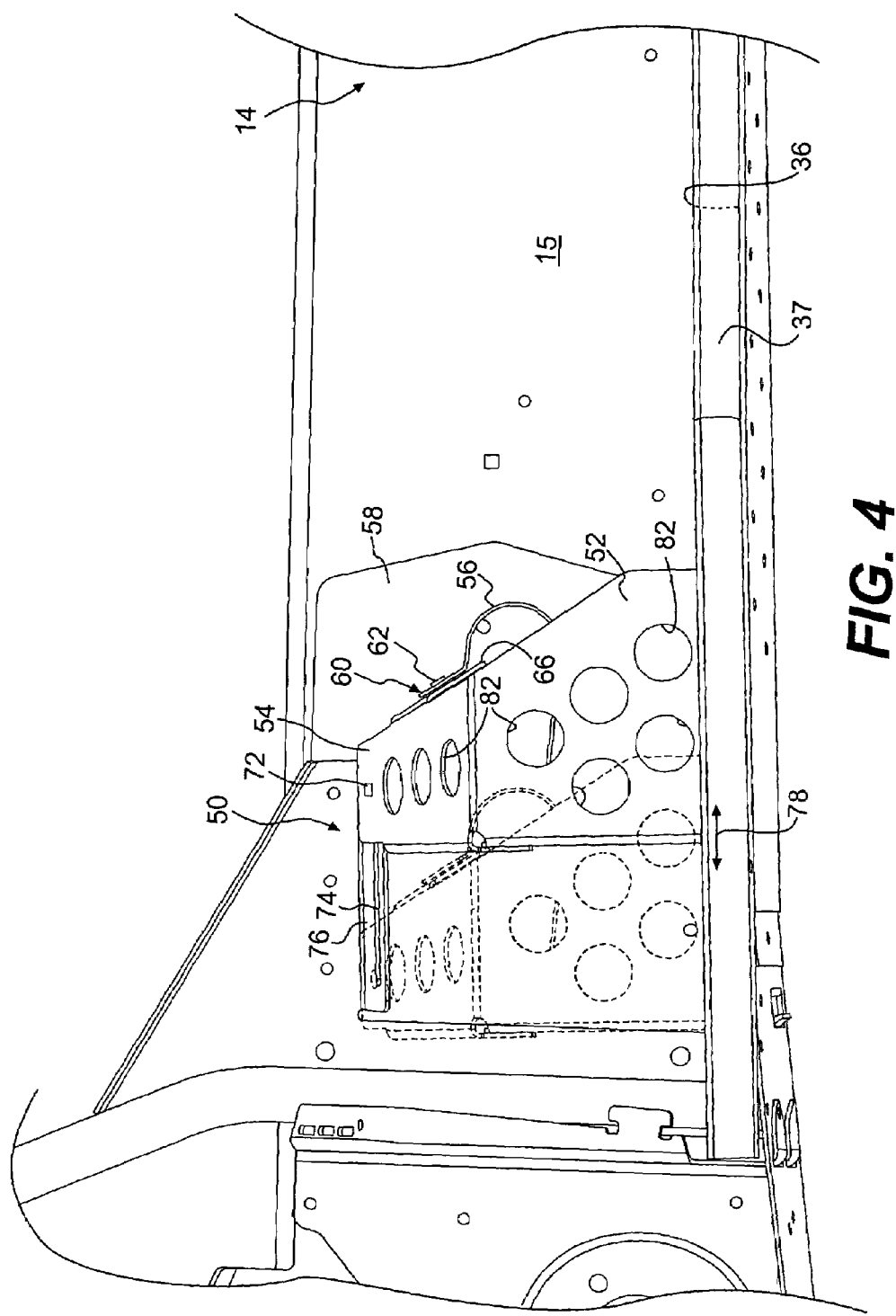
FIG. 4 is an enlarged side elevation view showing the footholds of the present invention in two different positions.

Referring now to FIGS. 3 and 4, the foothold assembly 50 is disposed on a forward portion of each footrest 36 and, much like conventional footholds, provides vertical support above the driver's foot which can be used by the driver to hold himself to the snowmobile. The footholds accordingly permit the driver to lean out to one side, the foothold on the opposite side of the snowmobile providing support for the driver to retain himself to the snowmobile using his foot. The foothold assembly 50 also acts to help retain the driver's foot in contact with the footrests 36 when riding over rough terrain.

The foothold assembly 50 comprises an outer structure 51 including a vertical outside wall portion 52 which extends substantially perpendicularly from the footrest 36 and is connected to a top wall portion 54, which angularly extends inwardly from the upper edge of the vertical outside wall portion 52 toward the inside plate 58 fixed to the vertical side 15 of the tunnel 14. The outside wall portion 52 is more particularly in contact with the rolled edge lip 37 of the footrest 36. Preferably, the bottom edge of the outside wall portion 52 has a footrest engagement member such as an L-shaped lip (not shown) which hooks under the edge lip 37. This allows the outside wall portion 52, and accordingly the entire outer structure 51, to be able to slide forwards and backwards on the footrest 36, but prevents any unwanted vertical movement of the outer structure 51. This horizontal displacement of the outer structure 51 of the foothold assembly 50 will be described in further detail below. A front wall portion 53 completes the outer structure 51 of the foothold assembly 50, being connected to both the side wall portion 52 and the top wall portion 54 and being substantially perpendicular thereto. The front wall portion 53 prevents the driver's boot from sliding too far forward and becoming jammed into the foothold member 56 described in more detail below. These three wall portions of the outer structure 51 of the foothold assembly 50 create, with the footrest 36 and the vertical side 15 of the tunnel 14, an open-ended enclosure adapted to receive the foot of a driver therein. The driver's foot, when projecting into the outer structure 51 of the foothold assembly 50, is accordingly prevented from slipping sideways off the footrest 36, being retained at least by the outer wall portion 52. All three walls of the outer structure 51, namely the outside wall portion 52, the top wall portion 54 and the front wall portion 53, are preferably provided with a plurality of holes 82 defined therein. These holes 82 permit snow to easily escape from the outer structure 51, such that the driver's boot is not blocked from entering the open-ended enclosure of the foothold assembly 50.

The foothold member 56 is engaged to the outer structure 51 and projects into the enclosure defined therewithin. The foothold member 56 is adapted to abut the top of a boot of the driver to vertically retain the driver's foot in place. The foothold member 56 comprises a curved foot engaging element 57 fixed at a first end to the forward wall portion 53, and curving upward for engagement with a tab 66 integral with the top wall portion 54. Particularly, a vertical adjustment mechanism 60 is used to engage the foothold member 56 with the top wall portion 54, such that the vertical position of the foothold member 56 is adjustable relative to the outer structure 51 of the foothold assembly 50, and therefore also relative to the footrest 36. This vertical height adjustment of the foothold member 56 permits boots of different sizes to be accommodated by the foothold assembly 50. The vertical adjustment mechanism 60 comprises a fastener 62 which engages the end portion 63 of the foothold member 56 and which mates with a slot 64 defined in the tab 66. The end portion 63 of the foothold member 56 can accordingly be selectively fixed in place on the tab 66 of the top wall portion 54, such that the foothold member 56 can be fixed at a selected height, the range of movement of the fastener 62 in the slot 64 providing the height adjustment available for the foothold member 56.

A longitudinal adjustment mechanism 70 permits the entire outer structure 51 of the foothold assembly, including the foothold member 56, to be longitudinally displaceable along the footrest 36 and to be selectively fastenable in place thereon. Longitudinal displacement as used herein is defined as movement forwardly or rearwardly on the snowmobile. As described above, the bottom edge of the outside wall portion 52 has an L-shaped lip (not shown) which hooks under the edge lip 37 of the footrest 36. This allows the outside wall portion 52, and accordingly the entire outer structure 51, to be able to slide forwards and backwards on the footrest 36, but prevents any unwanted vertical movement of the outer structure 51. The inside end of the top wall portion 54 sits on top of a support tab 76 fixed to either the vertical side wall 15 of the tunnel 14 or the inside plate 58. The outwardly extending support tab 76 is disposed at an angle corresponding to that of the top wall portion 54, such that the inside end of the top wall portion 54 can slide forward and backward on the support tab 76. The entire foothold assembly 50 can therefore be displaced in a substantially horizontal and longitudinal direction indicated by arrows 78. The longitudinal adjustment and locking mechanism 70 comprises generally a fastener 72 which engages the inside end of the top wall portion 54, and is received within a horizontally extending slot 74 defined in the support tab 76. With the fastener 72 loosened, the foothold assembly 50 can be horizontally slid forward or backward as necessary. Once it has been displaced to a desired position, the fastener 72 can be tightened to fasten the foothold assembly 50 in place on the footrest 36. The fastener is preferably a cam-lock type system, permitting the driver to easily change the position of the foothold assembly 50. It is to be understood that the fastener could conversely be fixed to the support tab 76 on the tunnel 14, and a corresponding slot being defined in the inside end of the top wall portion 54.

Accordingly, the foothold assembly 50 can be longitudinally displaced on the footrest 36 such that it can be fixed in a desired position thereon, permitting the foothold assembly 50 to be located by the driver of the snowmobile to accommodate in any one of a plurality of possible foot positions on the footrests 36. Therefore, many riding positions are available to the driver of the snowmobile. The position of the footholds can be selected to accommodate drivers of different heights, and to permit different foot positions corresponding to different riding styles for the same driver.

Figure 2:
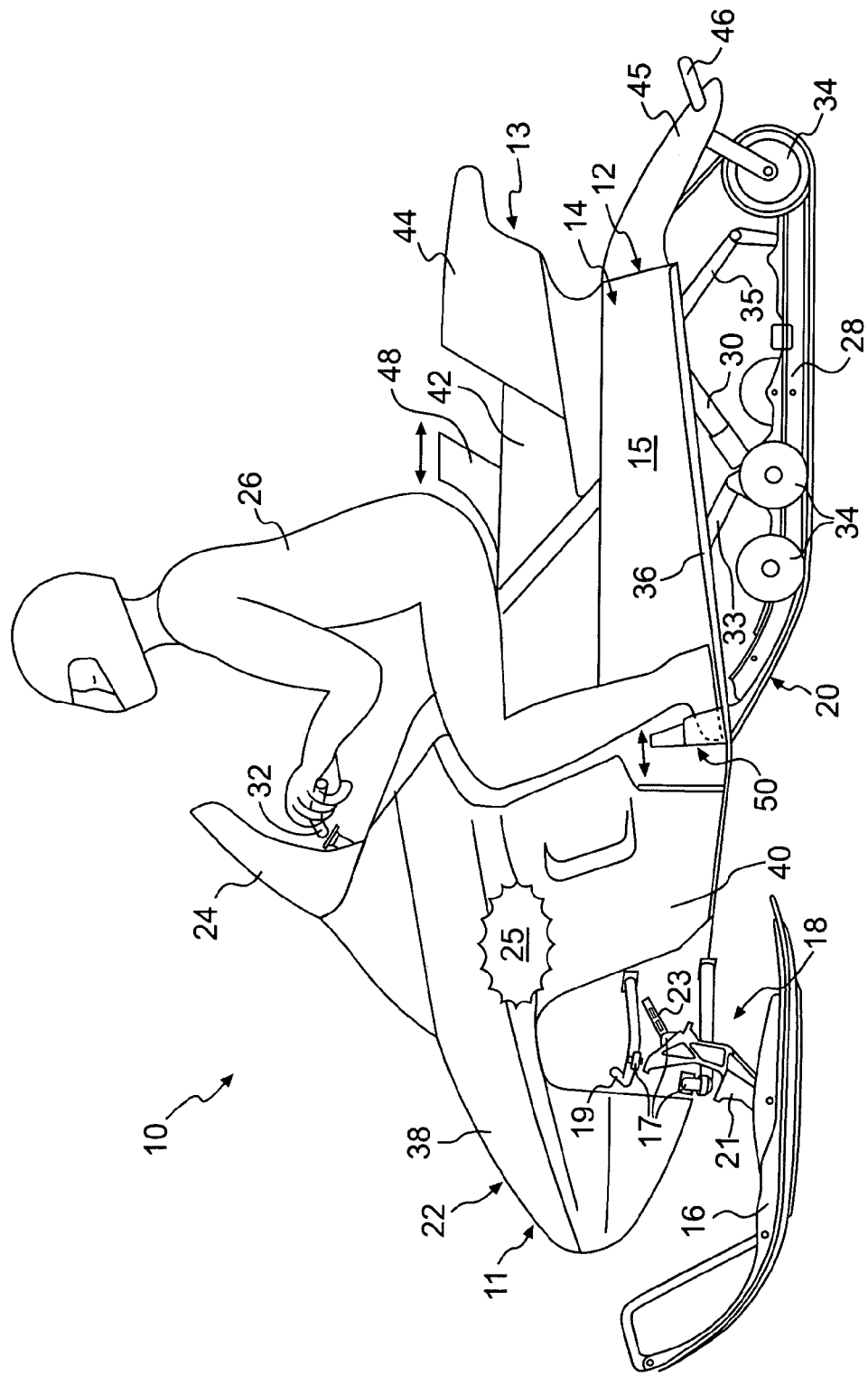
FIG. 2 is a side elevation view of the snowmobile of FIG. 1a showing the user in a more aggressive riding position.

For example, a driver can sit on the snowmobile in a traditional type of riding position, wherein the feet are disposed in front of the knees and the knees are slightly above the hips, as shown in FIG. 1. In this riding position, the foothold assembly 50 is located in a forward position. As mentioned above, although this is a very comfortable riding position, it is not a very active one. When the driver needs to raise himself from the seat, they have to raise themselves from the seat using largely their arms. With the drivers feet so far forward, it can also be awkward to stay in a standing position. FIG. 2 depicts a more active riding position, wherein the driver's feet are further back on the footrests 36, behind the knees. Accordingly, in this more active riding position, the foothold assembly 50 is located in a rearward position to accommodate the more rearward position of the driver's feet. If the foothold assembly 50 is slid rearward a sufficient distance, the knees of the driver can end up below the hips, which allows for an even more active driver position and allows the quadriceps muscles of the driver to absorb most impacts. Such a more active body position enables the driver to more easily stand up when necessary, and to use his legs to absorb most of the impacts when riding over rough terrain. Accordingly, no matter what particular riding position adopted by a driver of the snowmobile, the foothold assembly on either side of the vehicle can be adjusted and positioned where necessary such that the driver's feet can remain securely held down on the footrests 36. This permits a much safer and more controlled operation of the snowmobile, regardless of the riding position adopted by the driver.

It is also contemplated that an adjustable rear seat portion 48 is also displaceable forward and rearward. This permits the rear seat portion 48 to be displaced to suit the particular riding position adopted by the driver. When the foothold assemblies 50 are located in a forward position such that a conventional riding position is permitted, as depicted in FIG. 1, the rear seat portion 48 is preferably moved back and fixed in a rearward position as shown. When the foothold assemblies 50 are located in a rearward position allowing a more active riding position, as depicted in FIG. 2, it is contemplated that the driver will shift his weight forward on the seat, thereby placing his knees below his hips, and thus the rear seat portion 48 is adapted to be moved forward and fixed in a forward position as shown. The adjustable rear seat portion 48 also helps to position the knees of the driver in a relaxed position or an active position, if it is located in a rearward or forward position respectively. The adjustable rear seat portion 48 is preferably a relatively small backrest portion of the seat 42 which prevents the driver from sliding backwards, as depicted in FIGS. 1 and 2. However, it is to be understood that more or less of the seat 42 can be similarly displaceable to correspond with an active or more conventional riding position.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A foothold assembly for a snowmobile having a chassis including a tunnel and footrests extending from either side of the tunnel for receiving feet of a driver thereon, the foothold assembly comprising:
   a foothold member adapted for receiving a foot of the driver, the foothold member being longitudinally displaceable relative to the footrests without requiring vertical displacement relative thereto, and being removably fastenable in place thereon.

2. The foothold assembly as defined in claim 1, wherein the foothold member is positionable in at least one of a forward position and a rearward position, the forward position allowing the driver to sit on the snowmobile in a first riding position and the rearward position allowing the driver to sit in a second riding position different than the first riding position.

3. The foothold assembly as defined in claim 1, wherein the foothold member is slidingly engageable with at least the footrests.

4. The foothold assembly as defined in claim 3, wherein the foothold member comprises an outer structure which is adapted to slide longitudinally relative to the footrests and has a foot engaging element engaged thereto, the foot engaging element being adapted to be vertically spaced from the footrests.

5. The foothold assembly as defined in claim 4, wherein the outer structure comprises a footrest engagement member which prevents vertical displacement of the outer structure relative to the footrests.

6. The foothold assembly as defined in claim 5, wherein the foot engaging element is vertically displaceable relative to the outer structure and is selectively fastenable in place above the footrests.

7. The foothold assembly as defined in claim 4, wherein the outer structure defines a rearwardly opening enclosure for receiving the foot of the driver therein.

8. The foothold assembly as defined in claim 7, wherein the outer structure defines a plurality of holes through wall portions thereof such that snow cannot accumulate therein.

9. The foothold assembly as defined in claim 7, wherein the outer structure comprises an outside vertical side wall, a top wall portion fixed to the outside wall portion and extending inwardly therefrom towards the tunnel, and a forward wall portion fixed to both the outside vertical side wall portion and the top wall portion.

10. A snowmobile comprising:
   a chassis including a tunnel;
   an engine disposed on the chassis;
   an endless drive track disposed below the tunnel and operatively connected to the engine for propulsion of the snowmobile;
   two skis disposed on the frame, each via a front suspension;
   a straddle seat disposed on the tunnel above the endless drive track and rearward of the engine;
   a steering device disposed on the frame forward of the seat; and
   a foothold member for retaining a foot of the driver in contact with the snowmobile, the foothold member being longitudinally displaceable relative to the footrests without requiring vertical displacement relative thereto and being removably fastenable in pace thereon.

11. The snowmobile as defined in claim 10, wherein the foothold member is positionable in at least one of a forward position and a rearward position, the forward position allowing the driver to sit on the snowmobile in a first riding position and the rearward position allowing the driver to sit in a second riding position which is a more active riding position than the first riding position.

12. The snowmobile as defined in claim 10, wherein the seat comprises an adjustable seat portion.

13. The snowmobile as defined in claim 12, wherein the adjustable seat portion is a rear seat portion which is forwardly and rearwardly displaceable.

14. The snowmobile as defined in claim 10, wherein the foothold member is in sliding engagement with at least the footrests.

15. The snowmobile as defined in claim 14, wherein the foothold member comprises an outer structure which slides longitudinally relative to the footrests and has a foot engaging element engaged thereto, the foot engaging element being vertically spaced from the footrests.

16. The snowmobile as defined in claim 15, wherein the outer structure slides within a slot defined in the footrests.

17. The snowmobile as defined in claim 16, wherein the footrests include a rolled outer edge defining the slot therein.

18. The snowmobile as defined in claim 15, wherein the outer structure comprises a footrest engagement member which prevents vertical displacement of the outer structure relative to the footrests.

19. The snowmobile as defined in claim 18, wherein the foot engaging element is vertically displaceable relative to the outer structure and is selectively fastenable in place above the footrests.

20. The snowmobile as defined in claim 15, wherein the outer structure defines a rearwardly opening enclosure for receiving the foot of the driver therein.

* * * * *